RICHARD GUINN, OF BALTIMORE, MARYLAND.

Letters Patent No. 89,039, dated April 20, 1869.

IMPROVED MEDICINE FOR PURIFYING THE BLOOD.

The Schedule referred to in these Letters Patent and making part of the same.

*To all whom it may concern:*

Be it known that I, RICHARD GUINN, of Baltimore, in the county of Baltimore, and State of Maryland, have invented a new and useful Preparation or Medicine, called "Guinn's Blood Renewer;" and I do hereby declare that the following is a full and exact description thereof.

My invention is useful and of great utility in all cutaneous diseases, and is a specific remedy for syphilis, and all diseases arising therefrom, such as scrofula, neuralgia, rheumatism, &c.

To enable others skilled in the art to make and use my invention, I will proceed to describe its composition and the manner in which it is made.

I take red sumac root; poison sumac root; sarsaparilla root; pine tops; white ash root; prickly ash root; sassafras root; and licorice root, in equal quantities.

I boil the above ingredients in water, sufficiently long to extract the strength therefrom, and until the mixture, by absorption and evaporation, is reduced to about one-tenth of its original quantity.

To every two gallons of the mixture thus prepared, I add one gallon of alcohol, and one quart of sirup. The sirup is made from loaf sugar.

The dose is from a teaspoonful to a wineglassful, three times a day, according to the age of the patient, the character and malignity of the disease.

What I claim as my invention, and desire to secure by Letters Patent, is—

The combination of the ingredients in the quantities or proportions, and for the purposes substantially as set forth.

RICHARD GUINN.

Witnesses:
G. E. SANGSTON,
W. HARRY LOO.